United States Patent
Rui et al.

(10) Patent No.: US 8,364,993 B2
(45) Date of Patent: Jan. 29, 2013

(54) ENERGY SAVING CIRCUIT OF MOTHERBOARD

(75) Inventors: Yi Rui, Shenzhen (CN); Ai-Yu Pan, Shenzhen (CN); Cheng-Lin Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 479 days.

(21) Appl. No.: 12/779,717

(22) Filed: May 13, 2010

(65) Prior Publication Data

US 2011/0252253 A1 Oct. 13, 2011

(30) Foreign Application Priority Data

Apr. 9, 2010 (CN) .......................... 2010 1 0143513

(51) Int. Cl.
*G06F 1/26* (2006.01)
*G06F 1/32* (2006.01)

(52) U.S. Cl. ......... 713/320; 713/300; 323/207; 323/210

(58) Field of Classification Search .................. 713/300, 713/320; 323/207, 210
See application file for complete search history.

(56) References Cited

U.S. PATENT DOCUMENTS

2007/0079157 A1* 4/2007 Wang et al. ................... 713/300

* cited by examiner

*Primary Examiner* — Kim Huynh
*Assistant Examiner* — Michael J Brown
(74) *Attorney, Agent, or Firm* — Altis Law Group, Inc.

(57) ABSTRACT

A voltage regulating circuit converts a first voltage and provides the converted first voltage to a first voltage pin of a north bridge chip after receiving a control signal from a south bridge chip. A second voltage pin of the north bridge chip is connected to a voltage converting circuit for receiving a second voltage. The logic control circuit receives a control signal from the super I/O chip and outputs a first control signal to turn on the switch to connect the first and the second voltage pins together. The logic control circuit also outputs a second control signal to the voltage regulating circuit to control the voltage regulating circuit to stop providing the converted first voltage to the first voltage pin of the north bridge chip. The voltage converting circuit provides the second voltage to the first voltage pin of the north bridge chip via the switch.

10 Claims, 2 Drawing Sheets

ENERGY SAVING CIRCUIT OF MOTHERBOARD

BACKGROUND

1. Technical Field

The present disclosure relates to energy saving technology, and particularly, to an energy saving circuit of a motherboard.

2. Description of Related Art

With development of technologies and ever increasing interest in protecting the environment and conserving energy, energy saving circuits designed in computer motherboards are becoming popular. At present, motherboards with active management technology (AMT) feature, use two different voltage converting circuits to separately provide 1.1 volts (V) to voltage pins MCH_CL and MCH of the north bridge chip on the motherboard.

When a computer is in S3 to S5 states, (S3 state: the computer controls the hard disk of the computer to turn off after the computer stores data in random access memory (RAM); S4 state: all devices of the computer stop working after the computer writes the data in the RAM memory to the hard disk; S5 state: all hardware devices of the computer are turned off, namely, the computer is turned off) the voltage pin MCH_CL of the north bridge chip needs 1.1V but the voltage pin MCH does not. When the computer is in S0 state (S0 state: the computer is in a normal working state, namely, all hardware devices of the computer are on), both voltage pins MCH_CL and MCH of the north bridge chip need 1.1V power. However, voltage converting efficiency of the voltage converting circuit which provides voltage to the voltage pin MCH_CL is about 61 percent, and voltage converting efficiency of the voltage converting circuit which provides voltage to the voltage pin MCH is about 90 percent. Therefore, low voltage converting efficiency of the voltage converting circuit which provides voltage to the voltage pin MCH_CL wastes power. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
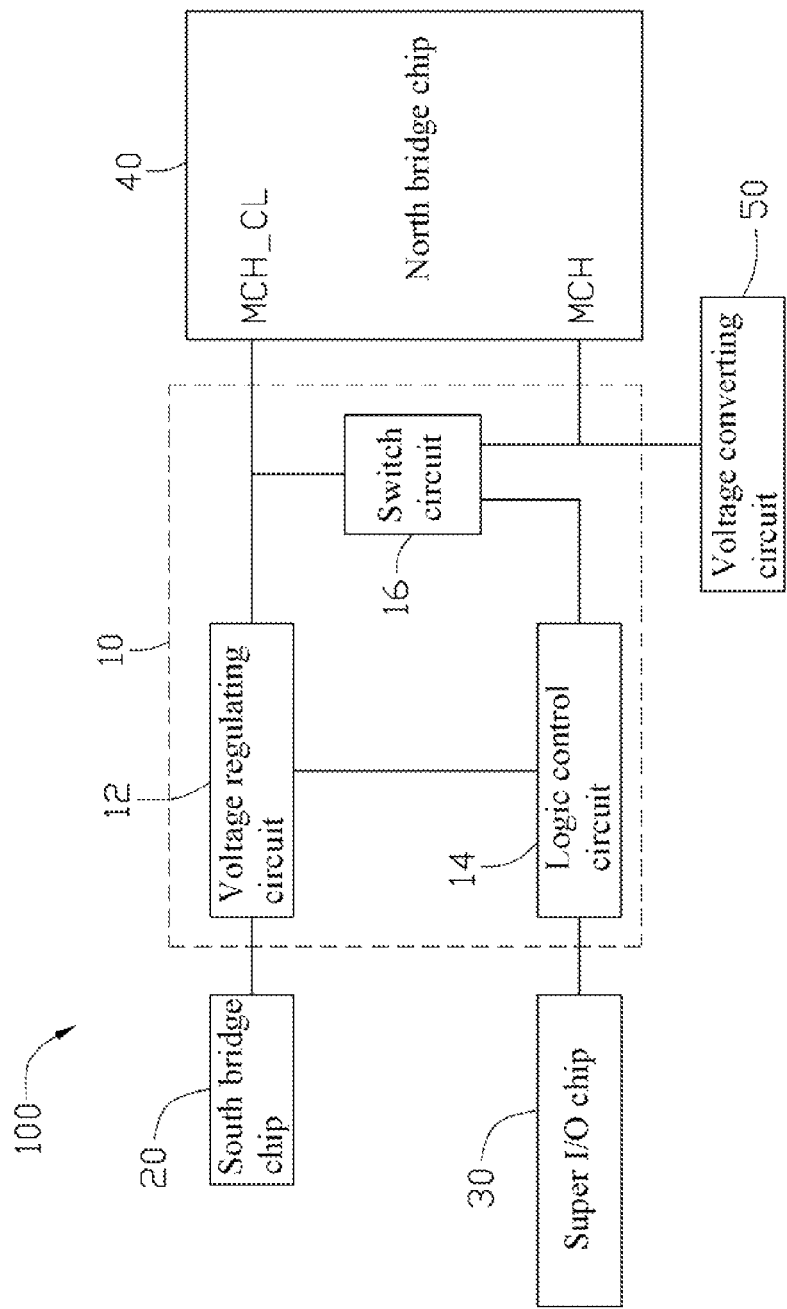
FIG. 1 is a block diagram of an energy saving circuit of a motherboard in accordance with an exemplary embodiment of the present disclosure.

Referring to FIG. 1, an energy saving circuit 10 of a motherboard 100 of a computer is provided for automatically switching two voltages, to save energy for the motherboard 100. The energy saving circuit 10 in accordance with an embodiment includes a voltage regulating circuit 12, a logic control circuit 14, and a switch circuit 16. An input terminal of the voltage regulating circuit 12 is connected to a south bridge chip 20 of the motherboard 100, and an output terminal of the voltage regulating circuit 12 is connected to the switch circuit 16 and a voltage pin MCH_CL of a north bridge chip 40 of the motherboard 100. An input terminal of the logic control circuit 14 is connected to a super input and output (I/O) chip 30 of the motherboard 100, and an output terminal of the logic control circuit 14 is connected to the switch circuit 16. A voltage pin MCH of the north bridge chip 40 is connected to the switch 16, and also connected to a voltage converting circuit 50 to receive a voltage from the voltage converting circuit 50. The voltage regulating circuit 12 converts a 1.8 volt (V) into a 1.1V and provides the converted 1.1V to the voltage pin MCH_CL of the north bridge chip 40 after receiving a control signal from the south bridge chip 20. The logic control circuit 14 receives a control signal from the super I/O chip 30, and outputs a first control signal to turn on the switch circuit 16 according to the control signal to connect the voltage pin MCH_CL to the voltage pin MCH of the north bridge chip 40. The voltage pins MCH_CL and MCH of the north bridge chip 40 receive voltages from the voltage converting circuit 50. The logic control circuit 14 can also output a second control signal to the voltage regulating circuit 12, for controlling the voltage regulating circuit 12 to stop providing the 1.1V to the voltage pin MCH_CL of the north bridge chip 40. In one embodiment, the voltage converting circuit 50 is a known circuit of a general computer motherboard.

Figure 2:
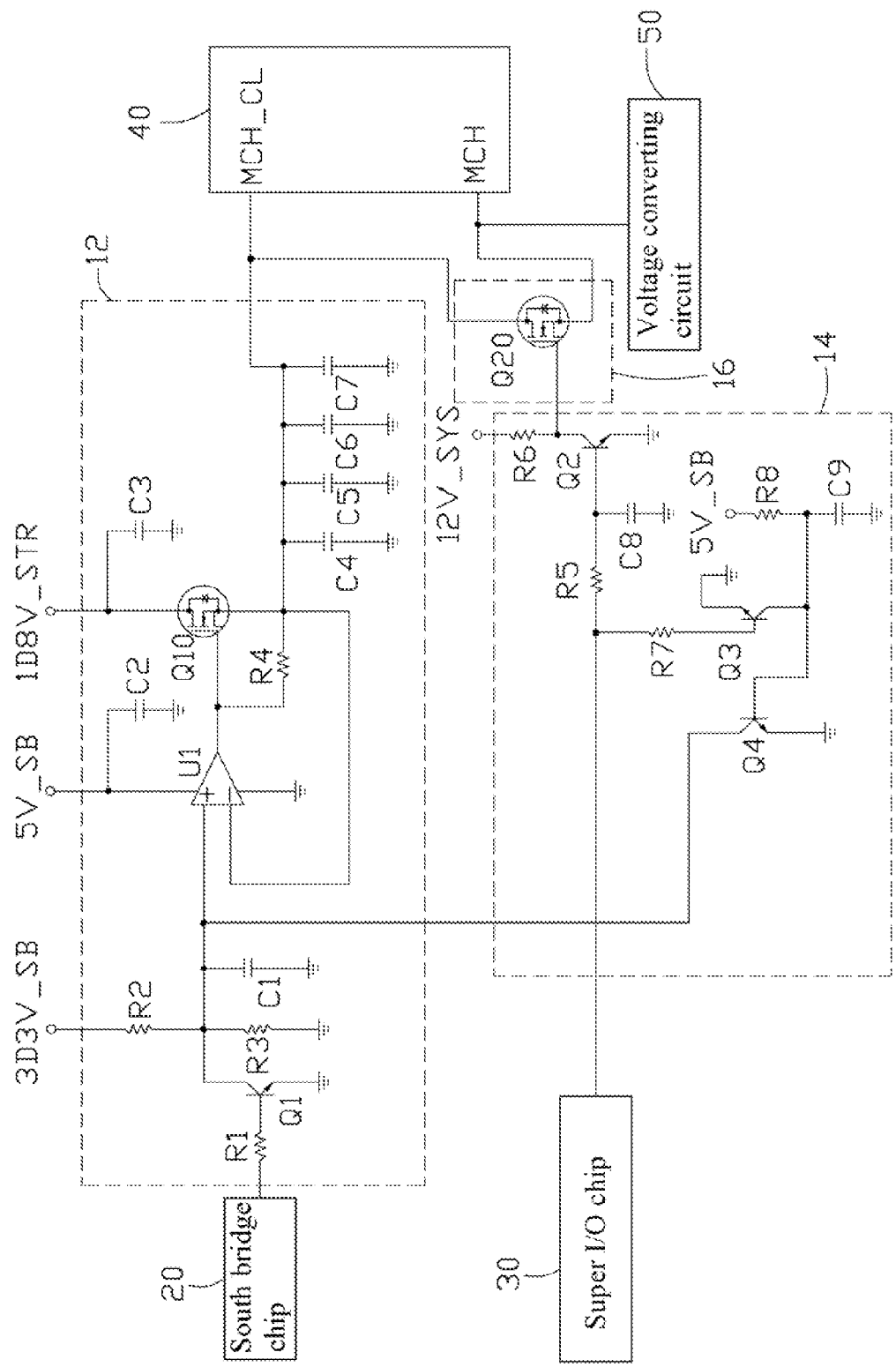
FIG. 2 is a schematic circuit diagram of FIG. 1.

Referring to FIG. 2, the voltage regulating circuit 12 includes resistors R1-R4, capacitors C1-C7, a transistor Q1, an amplifier U1, and a field effect transistor (FET) Q10. A base of the transistor Q1 is connected to the south bridge chip 20 via the resistor R1. An emitter of the transistor Q1 is grounded. A collector of the transistor Q1 is connected to a standby power source 3D3V_SB via the resistor R2, and also grounded via the resistor R3 and the capacitor C1 connected in parallel. A non-inverting input terminal of the amplifier U1 is connected to the collector of the transistor Q1 and connected to the logic control circuit 14. An output terminal of the amplifier U1 is connected to a gate of the FET Q10. A source of the FET Q10 is connected to an inverting input terminal of the amplifier U1 and the voltage pin MCH_CL of the north bridge chip 40. The resistor R4 is connected between the gate and the source of the FET Q10. The capacitors C4-C7 are connected in parallel between the voltage pin MCH_CL of the north bridge chip 40 and ground. A power terminal of the amplifier U1 is connected to a power source 5V_SB and grounded via the capacitor C2. A ground terminal of the amplifier U1 is grounded. A drain of the FET Q10 is connected to a power source 1D8V_STR and grounded via the capacitor C3.

The logic control circuit 14 includes resistors R5-R8, capacitors C8 and C9, and transistors Q2-Q4. A base of the transistor Q2 is connected to the super I/O chip 30 via the resistor R5. The capacitor C8 is connected between the base of the transistor Q2 and ground. An emitter of the transistor Q2 is grounded. A collector of the transistor Q2 is connected to the switch circuit 16 and connected to a power source 12V_SYS via the resistor R6. A base of the transistor Q3 is connected to a node between the super I/O chip 30 and the resistor R5 via the resistor R7. An emitter of the transistor Q3 is grounded. A collector of the transistor Q3 is connected to the power source 5V_SB via the resistor R8, and also grounded via the capacitor C9. A base of the transistor Q4 is connected to the collector of the transistor Q3. An emitter of the transistor Q4 is grounded. A collector of the transistor Q4 is connected to the non-inverting input terminal of the amplifier U1.

The switch circuit 16 includes a switch, such as an n-channel field effect transistor (FET) Q20. A gate of the FET Q20 is connected to the collector of the transistor Q2. A source of the FET Q20 is connected to the voltage pin MCH of the north bridge chip 40. A drain of the FET Q20 is connected to the voltage pin MCH_CL of the north bridge chip 40.

In use, when the motherboard 100 is in S0 state (S0 state: the computer is in a normal work state, namely, all hardware devices of the computer are on), firstly, the south bridge chip 20 outputs a low voltage level signal. The base of the transistor Q1 receives the low voltage level signal and turns off. The non-inverting input terminal of the amplifier U1 receives a high voltage level signal from the power source 3D3V_SB, and the output terminal of the amplifier U1 outputs a high voltage level signal. The gate of the FET Q10 receives the high voltage level signal from the output terminal of the amplifier U1 and turns on. The power source 1D8V_STR outputs 1.8V to the voltage pin MCH_CL of the north bridge chip 40 via the FET Q10. Secondly, the super I/O chip 30 outputs a low voltage level signal. The base of the transistor Q2 receives the low voltage level signal from the super I/O chip 30 and turns off. The gate of the FET Q20 receives a high voltage level signal from the power source 12V_SYS and turns on, to connect the voltage pin MCH_CL to the voltage pin MCH of the north bridge chip 40. The base of the transistor Q3 receives the low voltage level signal from the super I/O chip 30 and turns off. The base of the transistor Q4 receives a high voltage level signal from the power source 5V_SB via the resistor R8 and turns on. The non-inverting input terminal of the amplifier U1 receives a low voltage level signal from the transistor Q4 and the output terminal of the amplifier U1 outputs a low voltage level signal. The gate of the FET Q10 receives the low voltage level signal from the output terminal of the amplifier U1 and turns off. The power source 1D8V_STR stops providing the 1.8V to the voltage pin MCH_CL of the north bridge chip 40. Here, both the voltage pins MCH_CL and MCH of the north bridge chip 40 receive voltage from the voltage converting circuit 50.

When the motherboard 100 is at S0 state, the super I/O chip 30 controls the switch circuit 16 to turn on to connect the voltage pin MCH_CL to the voltage pin MCH of the north bridge chip 40, and controls the voltage regulating circuit 12 to stop providing voltage to the voltage pin MCH_CL of the north bridge chip 40. Therefore, the energy saving circuit 10 switches the voltage regulating circuit 12, which has a low voltage converting efficiency to the voltage converting circuit 50, which has a high voltage converting efficiency, to supply power to the voltage pin MCH_CL of the north bridge chip 40, to save energy for the motherboard 100.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An energy saving circuit for a motherboard, comprising:
    a switch comprising a control terminal, a first terminal connected to a first voltage pin of a north bridge chip of the motherboard, and a second terminal connected to a second voltage pin of the north bridge chip and a voltage converting circuit;
    a voltage regulating circuit comprising an input terminal connected to a south bridge chip of the motherboard, and an output terminal connected to the first terminal of the switch and the first voltage pin of the north bridge chip, the voltage regulating circuit converting a first voltage outputted by a first power source and providing the converted voltage to the first voltage pin of the north bridge chip after the voltage regulating circuit receives a first control signal from the south bridge chip; and
    a logic control circuit comprising an input terminal connected to a super input/output (I/O) chip of the motherboard and an output terminal connected to the control terminal of the switch, wherein the logic control circuit receives a second control signal from the super I/O chip to turn on the switch according to the second control signal, to connect the first voltage pin to the second voltage pin of the north bridge chip via the first and second terminals, the logic control circuit also outputs a third control signal to the voltage regulating circuit to control the voltage regulating circuit to stop providing a voltage to the first voltage pin of the north bridge chip, the voltage converting circuit provides a voltage to the first voltage pin of the north bridge chip via the switch.

2. The energy saving circuit of claim 1, wherein the voltage regulating circuit comprises first to third resistors, a first capacitor, a first transistor, an amplifier, and a first field effect transistor (FET), a base of the first transistor is connected to the south bridge chip, an emitter of the first transistor is grounded, a collector of the first transistor is connected to a standby power source via the first resistor and grounded via the second resistor, and also connected to a non-inverting input terminal of the amplifier, the non-inverting input terminal of the amplifier is connected to the logic control circuit, an output terminal of the amplifier is connected to a gate of the first FET, a source of the first FET is connected to an inverting input terminal of the amplifier and the first voltage pin of the north bridge chip, the third resistor is connected between the gate and the source of the first FET, the first capacitor is connected between the source of the first FET and ground, a power terminal of the amplifier is connected to a second power source, a ground terminal of the amplifier is grounded, a drain of the first FET is connected to the first power source.

3. The energy saving circuit of claim 2, wherein the base of the first transistor is connected to the south bridge chip via a fourth resistor.

4. The energy saving circuit of claim 2, wherein the voltage regulating circuit further comprises second to seventh capacitors, the second capacitor is connected between the non-inverting input terminal of the amplifier and ground, the third capacitor is connected between the power terminal of the amplifier and ground, the fourth capacitor is connected between the drain of the first FET and ground, the fifth to the seventh capacitors are connected in parallel between the source of the first FET and ground.

5. The energy saving circuit of claim 4, wherein the logic control circuit comprises fourth and fifth resistors, an eighth capacitor, and second to fourth transistors, a base of the second transistor is connected to the super I/O chip, an emitter of the second transistor is grounded, a collector of the second transistor is connected to the control terminal of the switch and connected to a third power source via the fourth resistor, a base of the third transistor is connected to the super I/O chip, an emitter of the third transistor is grounded, a collector of the third transistor is connected to the second power source via the fifth resistor and also grounded via the eighth capacitor, a base of the fourth transistor is connected to the collector of the third transistor, an emitter of the fourth transistor is grounded, a collector of the fourth transistor is connected to the non-inverting input terminal of the amplifier.

6. The energy saving circuit of claim 5, wherein the base of the second transistor is connected to the super I/O chip via a sixth resistor.

7. The energy saving circuit of claim 5, wherein the base of the third transistor is connected to the super I/O chip via a sixth resistor.

8. The energy saving circuit of claim 5, wherein the logic control circuit further comprises a ninth capacitor connected between the base of the second transistor and ground.

9. The energy saving circuit of claim 5, wherein the standby power source is a 3.3 volt (V) power source, the first power source is a 1.8V power source, the second power source is a 5V power source, and the third power source is a 12V power source.

10. The energy saving circuit of claim 9, wherein the switch is an n-channel field effect transistor, the control terminal, the first and the second terminals of the switch are corresponding to a gate, a drain, and a source of the n-channel field effect transistor.

* * * * *